(12) United States Patent
Lee et al.

(10) Patent No.: US 10,688,981 B2
(45) Date of Patent: Jun. 23, 2020

(54) HYBRID VEHICLE AND METHOD OF CONTROLLING MODE TRANSITION

(71) Applicants: Hyundai Motor Company, Seoul (KR); Kia Motors Corporation, Seoul (KR)

(72) Inventors: Jea Mun Lee, Seoul (KR); Joon Young Park, Seoul (KR); Ji Hoon Kang, Seoul (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 309 days.

(21) Appl. No.: 15/718,694

(22) Filed: Sep. 28, 2017

(65) Prior Publication Data

US 2018/0170356 A1 Jun. 21, 2018

(30) Foreign Application Priority Data

Dec. 16, 2016 (KR) .................. 10-2016-0172824

(51) Int. Cl.
*B60W 20/00* (2016.01)
*B60W 20/20* (2016.01)
(Continued)

(52) U.S. Cl.
CPC ............. *B60W 20/20* (2013.01); *B60K 6/387* (2013.01); *B60K 6/442* (2013.01); *B60K 6/48* (2013.01); *B60W 10/02* (2013.01); *B60W 10/06* (2013.01); *B60W 10/08* (2013.01); *B60W 20/11* (2016.01); *B60W 20/12* (2016.01); *B60W 20/30* (2013.01); *B60W 20/40* (2013.01); *B60W 30/19* (2013.01); *B60W 40/09* (2013.01); *B60W 40/107* (2013.01); *B60K 2006/4825* (2013.01); *B60W 2050/0088* (2013.01); *B60W 2510/083* (2013.01); *B60W 2510/1005* (2013.01);
(Continued)

(58) Field of Classification Search
None
See application file for complete search history.

(56) References Cited

U.S. PATENT DOCUMENTS 5,927,415 A 7/1999 Ibaraki et al.
6,487,477 B1 11/2002 Woestman et al.
(Continued)

FOREIGN PATENT DOCUMENTS

| JP | H09117009 A | 5/1997 |
| JP | 2010215189 A | 9/2010 |
| KR | 20150020077 A | 2/2015 |

*Primary Examiner* — Truc M Do
(74) *Attorney, Agent, or Firm* — Slater Matsil, LLP (57) ABSTRACT

A method of controlling a mode transition of a hybrid vehicle includes determining whether a mode transition from a first mode to a second mode is required based on a first torque, the first torque being a current required torque. A second torque, which is a required torque expected to be generated at a near-future time from a current time, is also determined. A predicted gear shift time point and a predicted engagement time point of an engine clutch are determined based on the second torque. The mode transition to the second mode is performed when it is determined that the mode transition to the second mode is required and the predicted engagement time point is earlier than the predicted gear shift time point.

19 Claims, 8 Drawing Sheets

(51) Int. Cl.
*B60W 20/11* (2016.01)
*B60W 20/12* (2016.01)
*B60W 40/09* (2012.01)
*B60W 40/107* (2012.01)
*B60W 10/02* (2006.01)
*B60K 6/48* (2007.10)
*B60K 6/387* (2007.10)
*B60W 10/06* (2006.01)
*B60W 10/08* (2006.01)
*B60W 20/40* (2016.01)
*B60W 20/30* (2016.01)
*B60K 6/442* (2007.10)
*B60W 30/19* (2012.01)
*B60W 50/00* (2006.01)

(52) U.S. Cl.
CPC ..... *B60W 2520/10* (2013.01); *B60W 2540/10* (2013.01); *B60W 2540/12* (2013.01); *B60W 2540/30* (2013.01); *B60W 2552/20* (2020.02); *B60W 2556/50* (2020.02); *B60W 2710/023* (2013.01); *B60W 2710/1005* (2013.01); *B60Y 2200/92* (2013.01); *B60Y 2300/182* (2013.01); *B60Y 2300/188* (2013.01); *B60Y 2300/42* (2013.01); *B60Y 2300/43* (2013.01); *B60Y 2300/60* (2013.01); *Y02T 10/6234* (2013.01); *Y02T 10/6286* (2013.01); *Y10S 903/914* (2013.01); *Y10S 903/93* (2013.01)

(56) References Cited

U.S. PATENT DOCUMENTS

| | | |
|---|---|---|
| 8,007,402 B2 | 8/2011 | Tabata et al. |
| 8,306,681 B2 | 11/2012 | Soma |
| 2009/0118084 A1* | 5/2009 | Heap ............... B60K 6/365 477/5 |
| 2009/0118936 A1* | 5/2009 | Heap ............... B60K 6/365 701/54 |
| 2009/0118949 A1* | 5/2009 | Heap ............... B60W 10/06 701/55 |
| 2012/0029777 A1* | 2/2012 | Tao ............... F16H 61/0213 701/60 |
| 2013/0210575 A1* | 8/2013 | Kumazaki ............... B60K 6/48 477/20 |
| 2013/0304293 A1* | 11/2013 | Yoshikawa ............... B60K 6/48 701/22 |
| 2013/0317687 A1* | 11/2013 | Ito ............... B60K 6/48 701/22 |
| 2014/0018207 A1* | 1/2014 | Kobayashi ............... B60K 6/48 477/5 |
| 2014/0249710 A1* | 9/2014 | Nakanishi ............... B60K 6/48 701/22 |
| 2015/0134173 A1* | 5/2015 | Choi ............... B60W 20/00 701/22 |
| 2015/0353068 A1* | 12/2015 | Nefcy ............... B60W 10/06 701/22 |
| 2016/0046281 A1* | 2/2016 | Nedorezov ............... F02N 11/0851 701/22 |
| 2016/0046282 A1* | 2/2016 | Yamazaki ............... B60W 20/40 477/5 |
| 2016/0059840 A1* | 3/2016 | Nefcy ............... B60W 10/10 701/22 |
| 2016/0159339 A1* | 6/2016 | Cho ............... B60W 20/15 701/22 |
| 2017/0072945 A1* | 3/2017 | Park ............... B60W 20/40 |
| 2018/0118193 A1* | 5/2018 | Zhao ............... F16H 61/143 |
| 2018/0135744 A1* | 5/2018 | Kuang ............... F16H 61/0213 |

\* cited by examiner

HYBRID VEHICLE AND METHOD OF CONTROLLING MODE TRANSITION

CROSS-REFERENCE TO RELATED APPLICATIONS

This application claims priority to and the benefit of Korean Patent Application No. 10-2016-0172824, filed on Dec. 16, 2016, which application is hereby incorporated herein by reference.

TECHNICAL FIELD

The present invention relates to a hybrid vehicle and method of controlling a mode transition.

BACKGROUND

The demand for eco-friendly vehicles is increasing due to the constant demand for fuel efficiency improvement for vehicles and the strengthening of exhaust gas regulations in many countries. As a practical alternative to this, a hybrid electric vehicle/plug-in hybrid electric vehicle (HEV/PHEV) is provided.

Such a hybrid vehicle can provide optimal output and torque depending on how the engine and motor are operated in harmony in the course of driving with the two power sources. Particularly, in a hybrid vehicle adopting a parallel type hybrid system in which an electric motor and an engine clutch (EC) are mounted between the engine and the transmission, the output of the engine and the motor can be simultaneously transmitted to a drive shaft.

Generally, in a hybrid vehicle, electric energy is used during initial acceleration (i.e., EV mode). However, since electric energy alone has a limitation in meeting the driver's required power, use of the engine as the main power source is eventually required (i.e., the HEV mode). In such a case, in the hybrid vehicle, when the difference between the number of revolutions of the motor and the number of revolutions of the engine is within a predetermined range, the engine clutch is engaged so that the motor and the engine rotate together. At this time, when the number of revolutions is too low, engine stall may occur when the engine clutch is engaged. Therefore, the hybrid vehicle controls the number of revolutions of the engine and the motor such that the engine clutch starts to be engaged at a specific revolution number (hereinafter, referred to as "target engagement speed" for convenience) set in a relatively safe zone in the stall of the engine. The target engagement speed can be set differently according to the engine characteristics of the vehicle or the gear stage of the engagement time.

However, when the engine is started immediately when it is needed as a main power source, a delay often occurs until the engine clutch is actually engaged and the force of the engine is transmitted to the axle of the drive wheel. As a result, fuel loss occurs while the power of the engine does not contribute to driving, which is called "non-driving fuel loss". The manner in which a non-driving fuel loss occurs will be described with reference to FIG. 1.

Figure 1:
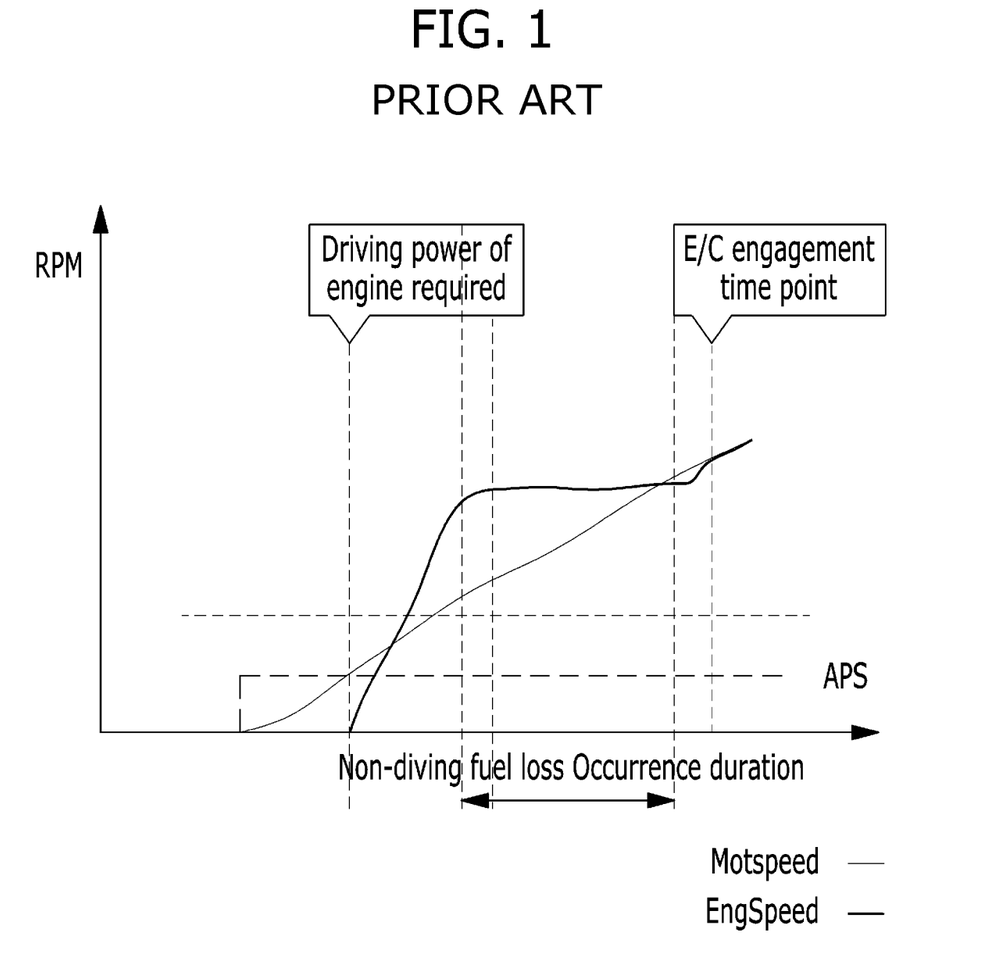
FIG. 1 is a view for explaining an example of a form in which a non-driving fuel loss occurs in a general hybrid vehicle.

FIG. 1 is a view for explaining an example of a form in which a non-driving fuel loss occurs in a general hybrid vehicle.

Referring to FIG. 1, when a driver operates the accelerator pedal (i.e., APS on), the required torque becomes large, and when it is determined by the vehicle that the driving power of the engine is required, the engine is started.

Since the engine is not loaded at the time of engine start-up, engine Speed (EngSpeed) rises rapidly but the motor speed (MotSpeed) may not reach the target engagement speed. In this case, the engine remains idle at the target engagement speed up to the engagement time, during which time a non-driving fuel loss occurs.

The above-mentioned non-driving fuel loss problem becomes more problematic when the target engagement speed is switched due to the gear shift. This will be described with reference to FIG. 2.

Figure 2:
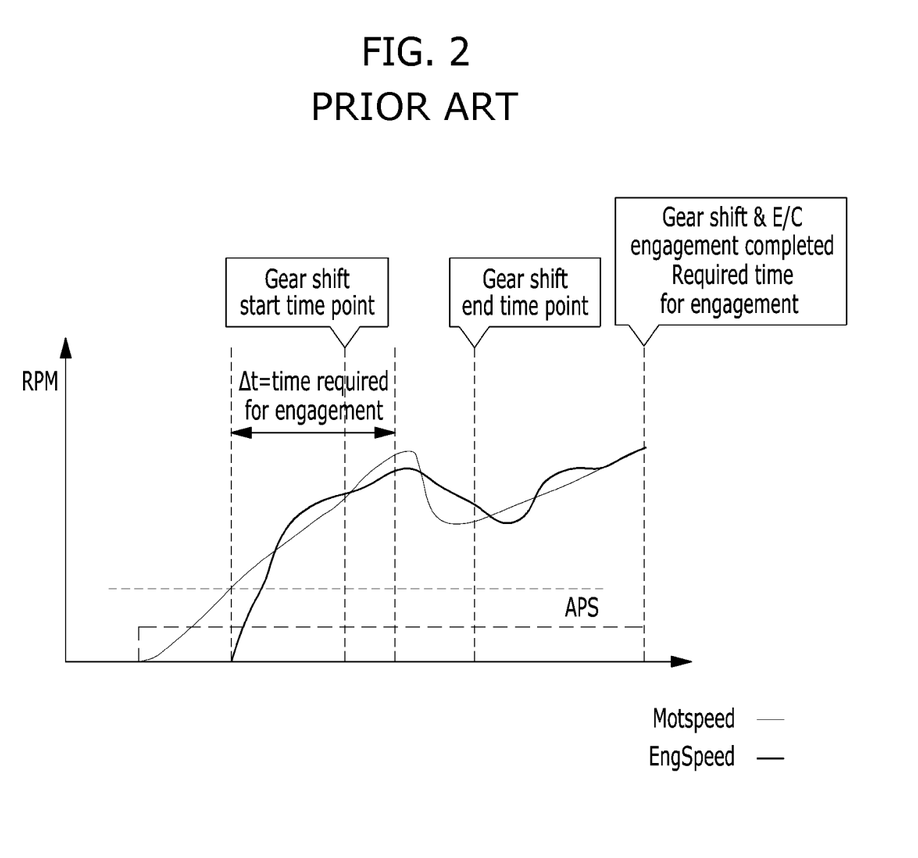
FIG. 2 is a view for explaining an example of a mode in which a non-driving fuel loss occurs in a general hybrid vehicle due to a gear shift.

FIG. 2 is a view for explaining an example of a mode in which a non-driving fuel loss occurs in a general hybrid vehicle due to a gear shift.

Referring to FIG. 2, when the driver operates the accelerator pedal (i.e., APS on), the required torque becomes large, and when it is determined by the vehicle that the driving power of the engine is required, the engine is started. However, if a gear shift occurs before the target engagement speed is reached, not only the target engagement speed varies, but also the engagement of the engine clutch is delayed from the gear shift start time point to the gear shift end time point.

As a result, after the engine is started, when a gear shift occurs before the target engagement speed is reached, there is a problem that the non-driving fuel loss is additionally generated as much as the gear shift interval.

SUMMARY

The present invention relates to a hybrid vehicle and method of controlling a mode transition therefor and, in particular embodiments, to a method of controlling a mode transition capable of predicting a driver's required torque to reduce non-driving fuel loss. A hybrid vehicle hybrid vehicle and method of controlling a mode transition can substantially obviate one or more problems due to limitations and disadvantages of the related art.

Embodiments the present invention provide a method of efficiently controlling a mode transition in a hybrid vehicle and a vehicle for performing the same.

Particular embodiments of the present invention provide a mode transition control method capable of reducing non-driving fuel loss due to a gear shift in a parallel type hybrid vehicle, and a vehicle for performing the same.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of controlling a mode transition of a hybrid vehicle may include determining whether a mode transition from a first mode to a second mode is required based on a first torque, the first torque being a current required torque; determining a second torque, the second torque being a required torque expected to be generated at a near-future time from a current time, determining a predicted gear shift time point and a predicted engagement time point of an engine clutch based on the second torque, and performing the mode transition to the second mode when it is determined that the mode transition to the second mode is required and the predicted engagement time is earlier than the predicted gear shift time point.

In another aspect of the present invention, a parallel type hybrid vehicle may include a driving information detection unit configured to interoperate with various sensors of the hybrid vehicle to detect driving information according to operation of the vehicle, a driver acceleration/deceleration prediction unit configured to generate a predicted value of a near-future acceleration/deceleration intention of a driver reflecting a driving environment of the vehicle, using information transmitted from the driving information detection unit by utilizing an acceleration/deceleration prediction model, and a hybrid control unit configured to determine a first torque and determine a second torque using the predicted value of the near-future acceleration/deceleration intention, the first torque being a current required torque and the second torque being a required torque expected to be generated at a near-future time after a current time. Here, the hybrid control unit may be further configured to determine whether a mode transition from a first mode to a second mode is required based the first torque, to determine a predicted gear shift time point and a predicted engagement time point of an engine clutch based on the second torque, and to perform the mode transition to the second mode when it is determined that the mode transition to the second mode is required and the predicted engagement time is earlier than the predicted gear shift time point.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF ILLUSTRATIVE EMBODIMENTS

Reference will now be made in detail to the preferred embodiments of the present invention, examples of which are illustrated in the accompanying drawings. The present invention may, however, be embodied in many different forms and should not be construed as limited to the embodiments set forth herein. In order to clearly illustrate the present invention in the drawings, parts not related to the description are omitted, and like parts are denoted by similar reference numerals throughout the specification.

Throughout the specification, when a part is referred to as "including" an element, it means that the part may include other elements as well, unless specifically stated otherwise. In addition, parts denoted by the same reference numerals throughout the specification denote the same components.

First, a hybrid vehicle structure to which embodiments of the present invention may be applied will be described with reference to FIG. 3.

Figure 3:
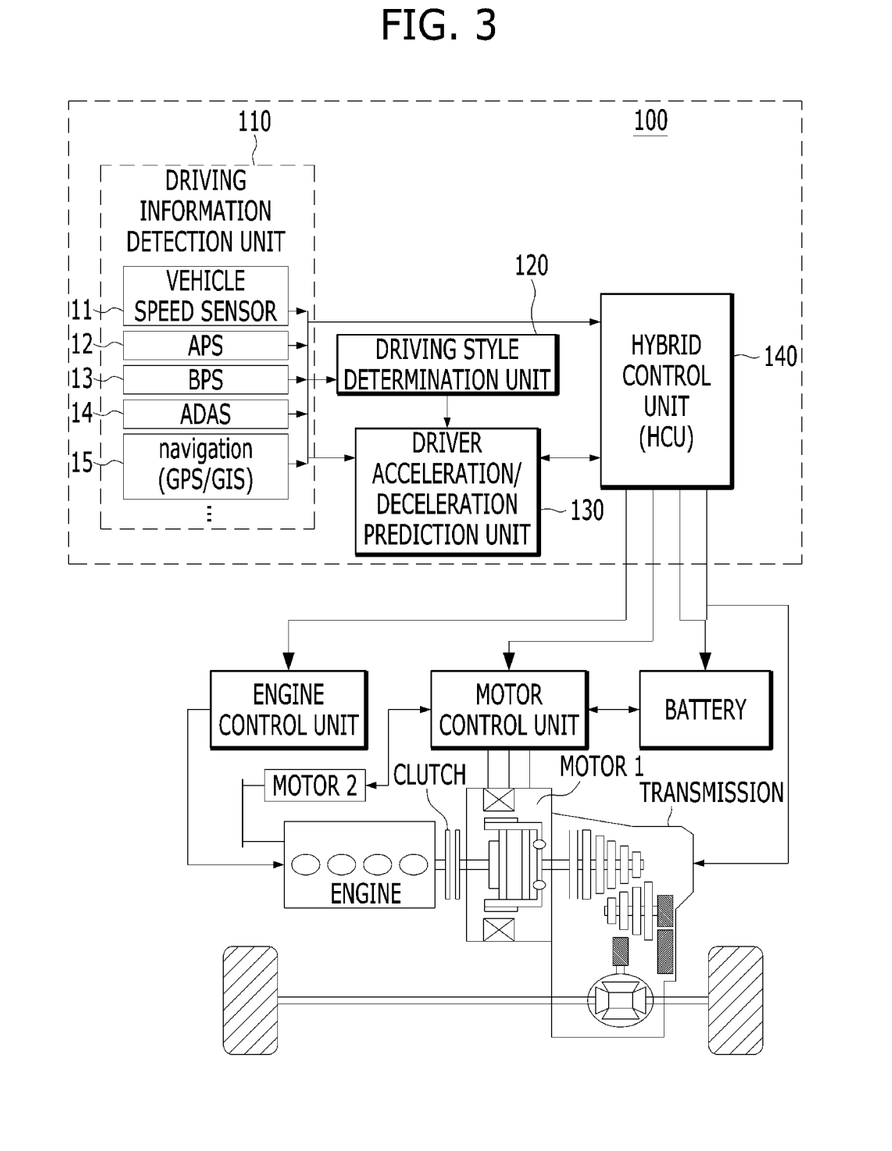
FIG. 3 is a block diagram schematically illustrating a control system of a hybrid vehicle according to an embodiment of the present invention.

FIG. 3 is a block diagram schematically illustrating a control system of a hybrid vehicle according to an embodiment of the present invention.

Referring to FIG. 3, the control system 100 of a hybrid vehicle according to an embodiment of the present invention includes a driving information detection unit 110, a driving style determination unit 120, a driver acceleration/deceleration prediction unit 130, and a hybrid control unit 140. This configuration is merely illustrative, and the transmission control system may be configured to include fewer elements (e.g., omitting the driving style determination unit) or more elements.

The driving information detection unit no detects drive information according to driving of the vehicle in operative connection with at least one of a vehicle speed sensor 11, an accelerator position sensor (APS) 12, a brake pedal sensor (BPS) 13, an advanced driver assistance system (ADAS) 14, and a navigation unit 15.

The driving information detection unit no detects the driver's accelerator operation status through the APS 12 and detects the brake operation status through the BPS 13.

The driving information detection unit no detects the vehicle speed through the vehicle speed sensor 11 and detects front behavior information including the relative distance and acceleration with respect to a proceeding vehicle through a radar sensor, a (stereo) camera, or the like of the ADAS 14. Of course, besides the radar and camera, various sensors such as an ultrasonic sensor and laser may be utilized depending on the configuration of the ADAS.

The driving information detection unit no detects navigation information (road environment information) such as GPS/GIS-based location information about the vehicle, road type, congestion degree, speed limit, intersection, tollgate, turn and gradient information. To provide this information, the navigation unit 15 may reference a built-in navigation map and traffic information collected through external wireless communication (e.g., telematics, TPEG, etc.).

The driving style determination unit 120 determines the driver's driving style based on a drive pattern such as an average velocity, an APS change amount (dAPS), and a BPS change amount (dBPS) according to the driver's manipulation of the vehicle.

For example, the driving style determination unit 120 may configure a fuzzy membership function using measurement factors such as the APS change amount, the BPS change amount, the vehicle speed, the gradient, and the like detected by the driving information detection unit 110 as input parameters, and calculates a short-term driving style index (SI=0 to 100%).

The driving style determination unit 120 may determine the driving style of the driver at a plurality of levels by dividing the calculated short-term driving style index (SI=0 to 100%) based on a predetermined reference ratio according to the driving style intensity.

The driver acceleration/deceleration prediction unit 130 learns an acceleration/deceleration prediction model according to the driving style by utilizing machine learning scheme and yields a predicted value of the driver's near-future acceleration/deceleration intention reflecting the driving environment of the vehicle and the driving style by utilizing the acceleration/deceleration prediction model. That is, the driver acceleration/deceleration prediction unit 130 may use the vehicle speed, the radar information, the navigation information, and the driving style of the driver detected through the driving information detection unit no as input information to quantitatively digitize the type of driving manipulation that occurs in units of relatively short time. Thereby, the driver acceleration/deceleration prediction unit 130 may determine the driver's momentary intention of acceleration/deceleration and generate a predicted value of near-future acceleration/deceleration of the driver. The predicted acceleration/deceleration value may be configured with a strength and probability of stepping on an accelerator or a brake pedal in a predetermined time unit in the near future.

A specific prediction algorithm of the acceleration/deceleration prediction unit 130 may include a neural network that complements a pre-constructed prediction model using a machine learning technique, which will be described later in more detail.

The hybrid control unit 140 controls the operation of each part for drive mode switching of the hybrid vehicle according to an embodiment of the present invention, and that integrally controls, as the highest control unit, the engine control unit and the motor control unit connected over a network.

The hybrid control unit 140 may analyze the driver's current required torque detected by the driving information detection unit no through the APS or BPS and transmit the analyzed torque to the TCU. In addition, the hybrid control unit may predict a required torque at a specific time in the near future based on the received predicted near-future acceleration/deceleration value and, and transmit the predicted torque to the TCU.

The TCU may acquire information on the current required torque and the predicted near-future required torque value from the hybrid control unit 140 to determine whether or not to perform gear-shift and transmit a gear-shift command corresponding to the determination result to the transmission.

In some embodiments, if the acceleration/deceleration prediction unit 130 predicts even the near-future required torque using the predicted near-future acceleration/deceleration value, the acceleration/deceleration prediction unit 130 may directly transmit the value of the near-future required torque to the TCU.

Alternatively, the TCU may determine whether or not to perform gear-shift according to the current required torque, and the hybrid control unit 140 may determine whether or not to perform gear-shift based on the predicted value of the near-future required torque. The result of the determination performed by the hybrid control unit 140 may be transmitted to the TCU so as to override the gear-shift determination of the TCU.

In this embodiment, the driving style determination unit may be omitted depending on the configuration. In this case, the driver acceleration/deceleration prediction unit 130 may perform acceleration/deceleration prediction, excluding an input value related to the driving style.

Hereinafter, a method for the driver acceleration/deceleration prediction unit 130 to predict the driver's acceleration/deceleration intention will be described with reference to FIGS. 4A and 4B.

Figure 4A:
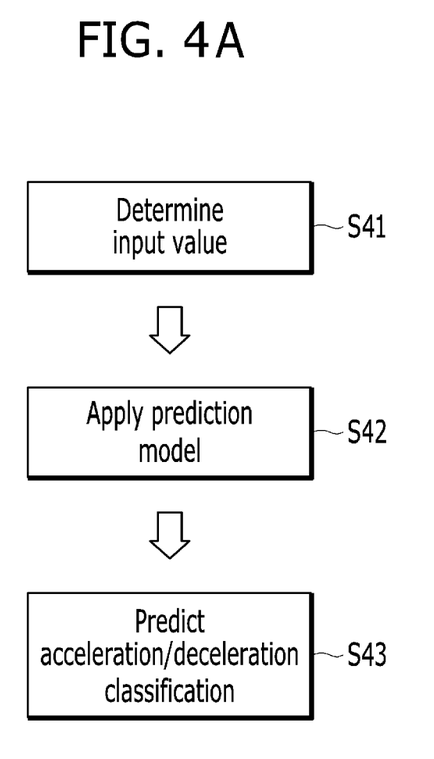
FIGS. 4A and 4B illustrate an exemplary process of predicting a driver's intention of acceleration/deceleration that may be applied to embodiments of the present invention.
Figure 4B:
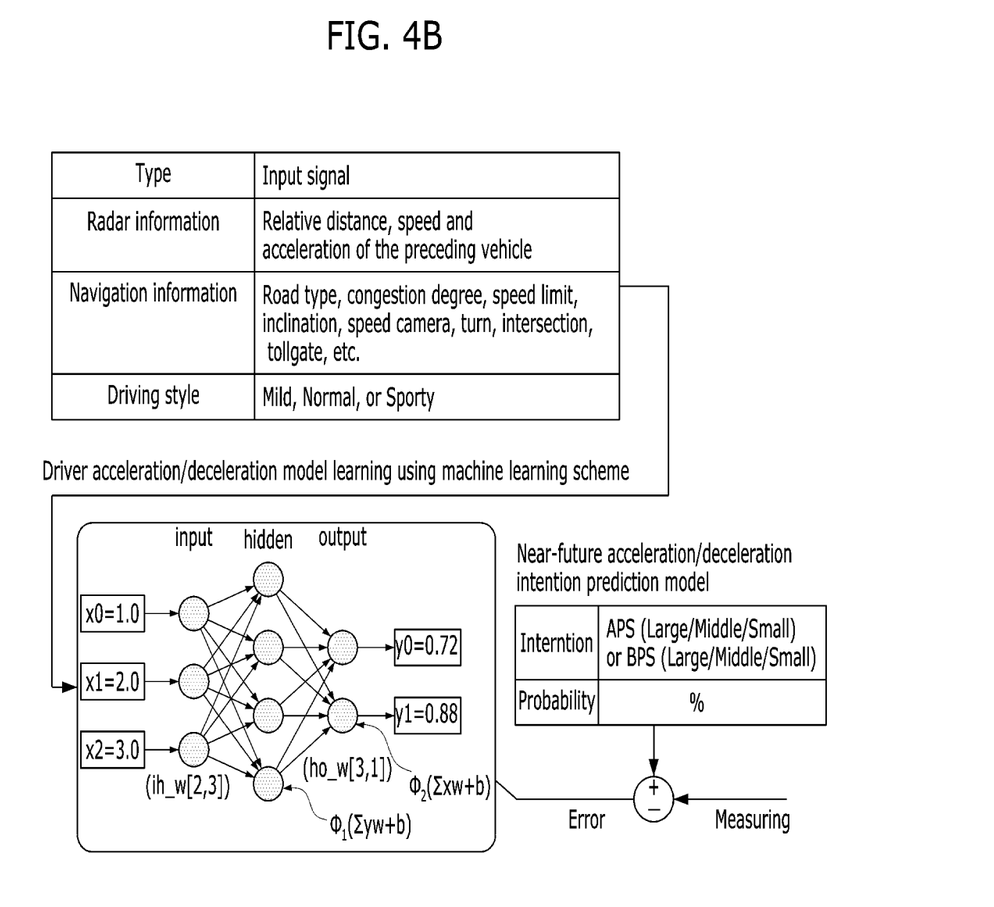

FIGS. 4A and 4B illustrate an exemplary process of predicting a driver's intention of acceleration/deceleration that may be applied to embodiments of the present invention.

Referring to FIG. 4A, the process of the driver acceleration/deceleration prediction unit 130 predicting the driver's acceleration/deceleration intention may be divided into three steps. Specifically, parameters to be used as input values for prediction may be determined first (S41). The prediction model may be modified through machine learning scheme (S42), and the acceleration and deceleration may be classified through the determined input value and the modified model to calculate a predicted value for a near-future situation (S43).

Here, determining the input value (S41) may include: 1) extracting candidates of the input value; 2) pre-processing input signals by integrating the input signals; and 3) selecting a final parameter using the pre-processed candidate values. As machine learning scheme, a time series model-based technique or a deep learning-based technique may be used. Examples of the time series model-based technique may include the autoregressive integrated moving average (ARIMA) technique, which describes changes in behavior over time with a stochastic indicator, and the multi-layer perceptron (MLP) technique, which uses nonparametric regression as a universal approximator. Examples of the deep learning-based technique may include the Stacked Auto Encoder (SAE) technique, which makes input/output data similar through dimension reduction, the Recurrent Neural Networks (RNNs) technique, which is a neural network algorithm to process sequential information, and the Long Short Term Memory (LSTM) technique suitable for long-term dependency learning. An example of the driver acceleration/deceleration prediction unit predicting the driver's near-future acceleration/deceleration intention using the neural network algorithm is shown in FIG. 4B.

Referring to FIG. 4B, the driver acceleration/deceleration prediction unit 130 according to an embodiment of the present invention includes a neural network that learns an acceleration/deceleration prediction model for each driving style of the driver using a machine learning technique.

Preferably, the driver acceleration/deceleration prediction unit 130 has a near-future acceleration/deceleration prediction model for each driving style pre-constructed based on big data which has been accumulated through test driving by utilizing the neural network before shipment of the vehicle.

Further, the driver acceleration/deceleration prediction unit 130 may reflect, in the near-future acceleration/deceleration prediction model for each driving style constructed using the neural network, the vehicle behavior data learned through actual driving of the vehicle after shipment of the vehicle, thereby generating a near-future acceleration/deceleration prediction model for each driving style personalized for the driver. At this time, the driver acceleration/deceleration prediction unit 130 may apply the learned behavior data to the near-future acceleration/deceleration prediction model of the corresponding driving style according to determination of the driver's driving style (mild, general, sporty, etc.).

The driver acceleration/deceleration prediction unit 130 may calculate a predicted value of the near-future acceleration/deceleration intention according to the driving style of the driver, using the driving environment that includes the vehicle speed, the radar information and the navigation information and the driving style of the driver as input information. Here, the driving style may be classified into a plurality of style types as shown in FIG. 4B, and may be configured by numerical values such as an average speed, an accelerator pedal change rate (dAPS), and a brake pedal change rate (dBPS)

In addition, the driver acceleration/deceleration prediction unit 130 may perform model modification according to the driver acceleration/deceleration model learning through machine learning scheme in real time while being mounted on the vehicle, or may receive a modified model from the outside and use the same for the prediction operation without learning.

In other words, when the model is allowed to be modified from the outside, the parameters serving as input values of learning may be transmitted to a telematics center or a cloud server, such that model modification through learning is performed from the outside and only a final model is transmitted to the vehicle.

Figure 5:
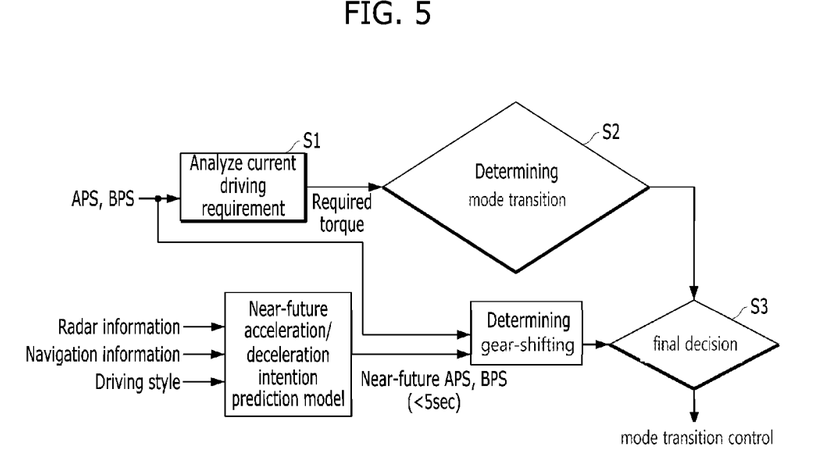
FIG. 5 illustrates a mode transition method using a near-future acceleration/deceleration prediction model according to an embodiment of the present invention.

FIG. 5 illustrates a mode transition method using a near-future acceleration/deceleration prediction model according to an embodiment of the present invention.

Referring to FIG. 5, the hybrid control unit 140 according to an embodiment of the present invention analyzes current operation requirements according to the driver's manipulation of the APS or BPS, calculates a required torque (S1). The hybrid control unit 140 determines whether to perform a mode transition from EV mode to HEV mode based on the current required torque (S2).

Meanwhile, the driver acceleration/deceleration prediction unit 130 outputs the driver's acceleration/deceleration intention prediction information using the near-future acceleration/deceleration prediction model, and then the hybrid control unit 140 determines whether a gear shift may occur or not on in the near-future (S3).

By combining the respective determination result of the steps of S2 and S3, the hybrid control unit 140 may determine whether to finally perform a mode transition or not.

Here, the predicted required torque value may be calculated by the driver acceleration/deceleration prediction unit 130 or may be calculated by the hybrid control unit 140. Although not shown in figure, the predicted required torque value may be calculated by a separate control unit for generating the predicted required torque value.

The mode transition method for the hybrid vehicle according to an embodiment of the present invention will be described in more detail with reference to FIG. 6, focusing on the control system 100 of the hybrid vehicle described above.

Figure 6:
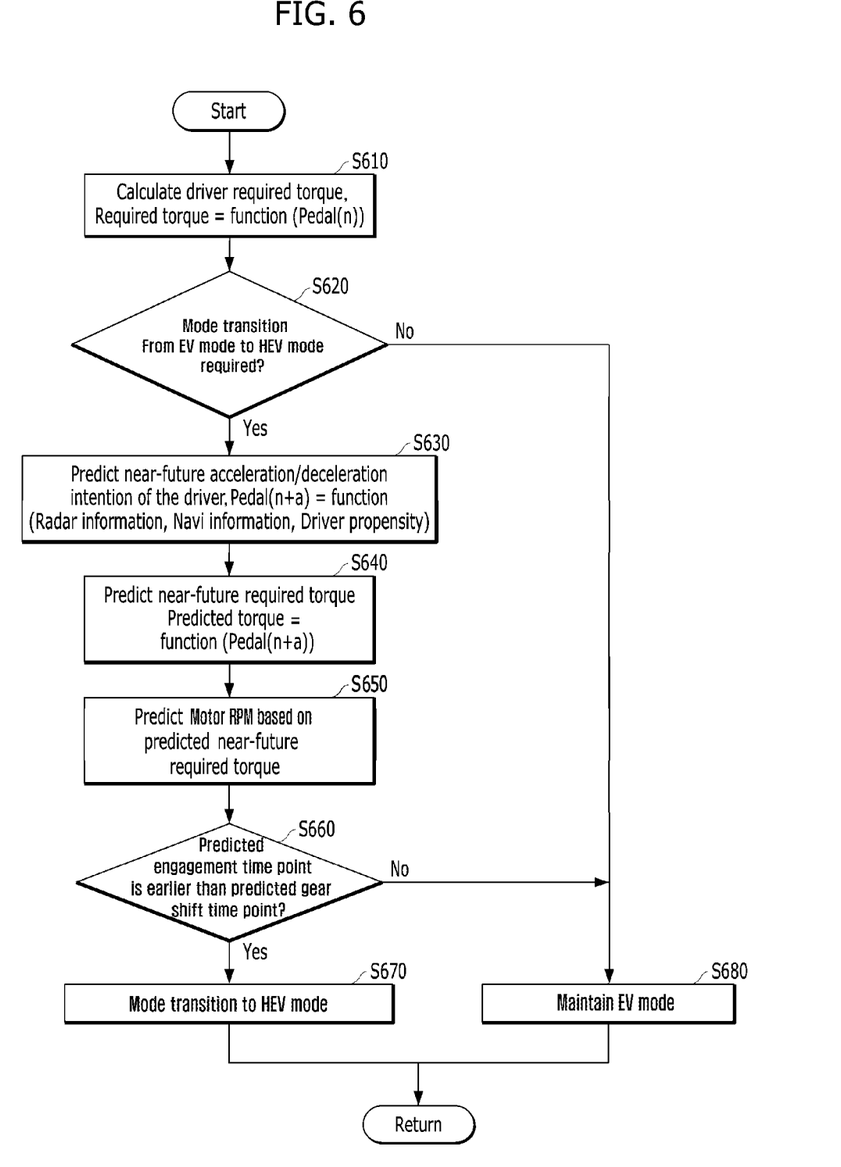
FIG. 6 is a flowchart illustrating a method of controlling a mode transition of a hybrid vehicle according to an embodiment of the present invention.

FIG. 6 is a flowchart illustrating a method of controlling a mode transition of a hybrid vehicle according to an embodiment of the present invention.

Referring to FIG. 6, the hybrid control unit first detects the APS change amount or the BPS change amount through the driving information detection unit no, and calculates the current driver required torque (S610).

Here, the required torque may be obtained from a function of the pedal position Pedal(n) sensed by the current pedal sensors APS and BPS. More specifically, '(n)' has a positive (+) value when the accelerator pedal APS is operated, and a negative (−) value when the brake pedal BPS is operated.

If the APS and the BPS are simultaneously detected due to the driver's faulty manipulation, the hybrid control unit may apply the brake override function to ignore the APS change and calculate the required torque only based on the BPS change.

The hybrid control unit 140 may determine whether a mode transition from the EV mode to the HEV mode is required based on the calculated required torque (S620).

The driver acceleration/deceleration prediction unit 130 generates a predicted value of the near-future acceleration/deceleration intention of the driver using the vehicle speed, the radar information, the navigation information, and the driving style of the driver as input information, when it is determined that the mode transition to the HEV mode is required (S630).

Here, Pedal(n+a) means the position of the acceleration/brake pedal after 'a' seconds. The value of 'a' is preferably less than 5 seconds, but embodiments of the present invention are not limited thereto. In addition, the predicted value of the near-future acceleration/deceleration intention may mean the driver's acceleration intention (APS increase or BPS decrease) or deceleration intention (APS decrease or BPS increase) predicted after a predetermined time in the near future, and the amount of change thereof or the pedal position. Of course, the information on the acceleration/deceleration intention, the amount of change, the position of the pedal, and the like may be included together with the probability information thereof.

Using the predicted value of the acceleration/deceleration intention Pedal(n+a) of the driver acceleration/deceleration prediction unit 130, the hybrid control unit 140 may predict the near-future required torque (S640).

In addition, the hybrid control unit 140 may predict the motor speed (RPM) at the near-future time by reflecting the predicted near-future required torque (S650).

Here, the predicted motor speed can be obtained through the function of the vehicle load (i.e., function(predicted required torque, vehicle load)) in the near-future.

The hybrid control unit 140 predicts and compares the time point at which the gear shift occurs (hereinafter, "predicted shifting time point") and the time at which the engine clutch can be engaged (hereinafter "predicted engagement time point") using the motor speed predicted value from the viewpoint of the transmission and the engine clutch (S660).

When the hybrid control unit 140 determines that the predicted engagement time point is earlier than the predicted shifting time point, the hybrid control unit 140 immediately performs mode transition to the HEV mode (S670). If not, the hybrid control unit 140 prohibits the engagement control of the engine clutch to maintain the EV mode (S680).

Of course, the hybrid control unit 140 may attempt to switch to the HEV mode after the shift is completed when the EV mode is maintained as the predicted engagement time point is later than the predicted shifting time point. At this time, the time point at which the engine is started may be determined as a time point at which the hybrid control unit 140 can optimally approach the target engagement speed according to the predicted motor speed and the predicted required torque in the near-future.

Hereinafter, the effect of the above-described embodiment a will be described by comparing the embodiment and a comparative example with reference to FIG. 7.

Figure 7:
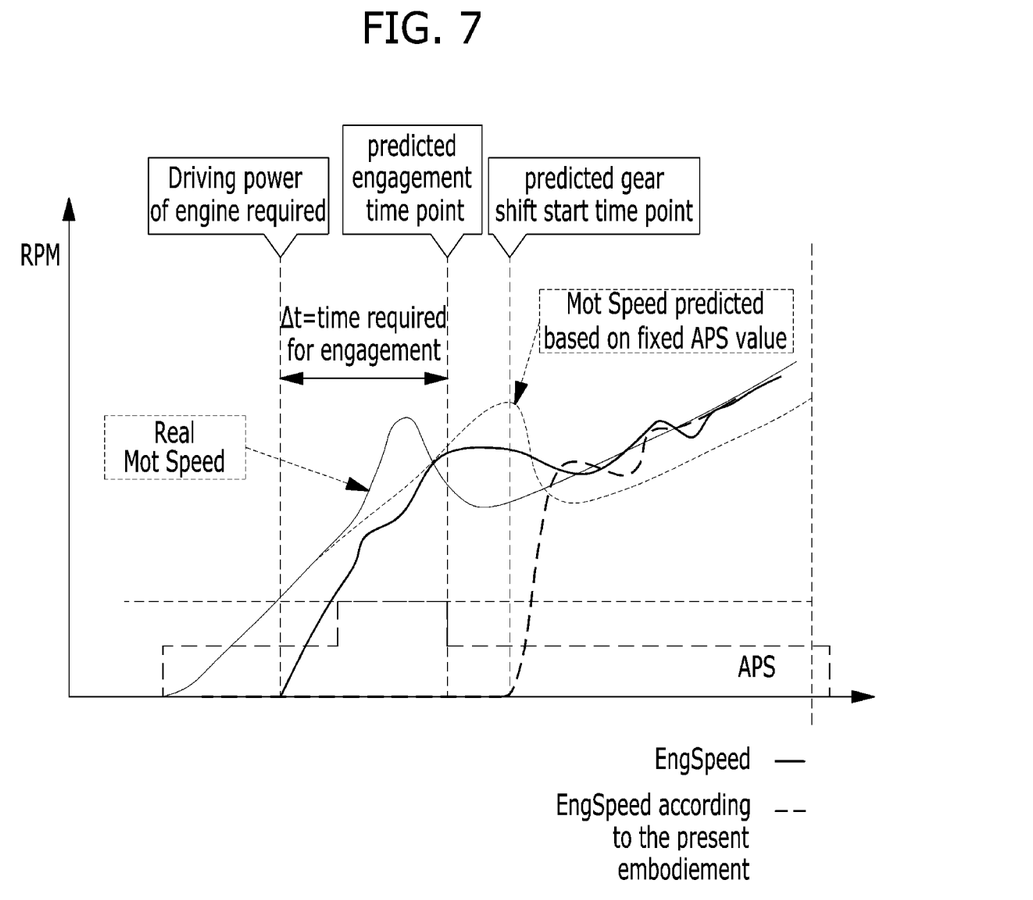
FIG. 7 is a diagram for explaining a difference between a mode transition method according to an embodiment of the present invention and a general mode transition method.

FIG. 7 is a diagram for explaining a difference between a mode transition method according to an embodiment of the present invention and a general mode transition method.

In FIG. 7, it is assumed that the actual motor speed (actual Mot Speed) rises as much as the shift is required in accordance with the Accelerator Pedal Sensor (APS) value, while the current motor speed increasing rate is linearly maintained in predicting the motor speed (MotSpeed) for the general mode transition method.

The time point of "driving power of engine required" can be determined as a time point that satisfies the formula of "current motor RPM>target engagement speed−motor speed increment during the time required for engagement". Here, the time required for engagement of the engine clutch can be determined according to the mechanical characteristics of the engine clutch and the control setting of the clutch controller. Also, the motor speed increment during the engagement time can be determined as "motor speed increasing rate*time required for engagement" when the motor speed is assumed to rise constantly.

The predicted engagement time point and the predicted gear shift start time point can be predicted through this motor speed calculation method.

However, since the calculation of the motor speed increment above can be applied only when assuming that the motor speed is constantly raised (for example, fixed APS value), the accuracy is degraded when the actual motor speed changes before the engine clutch engagement as shown in FIG. 7. Consequently, if the gear shift occurs first due to the motor speed increase before the predicted engagement time, the target engagement speed is changed, the engine that was started first causes loss of non-driving fuel until the engine reaches the changed target engagement speed after the gear shift.

In contrast, when the near-future motor speed prediction according to the present embodiment described above is performed, since the gear shift time point can be predicted, it is possible to prevent the engine starting by prohibiting the HEV mode transition before the gear shift, and thereby the non-driving fuel loss can be minimized since the engine start time can be determined corresponding to the motor speed.

In the above-described embodiments, the driver's acceleration/deceleration intention prediction model has been described as being constructed and modified through machine learning scheme of the driver's future intention corresponding to the current driving condition based on the data accumulated during actual driving of the vehicle. However, instead of using such prediction model, the predicted value of the near-future acceleration/deceleration intention may be determined by pre-establishing a rule. An example of such rule is shown in Table 1 below.

Further, although the future required torque has been described above as being predicted through near-future prediction, it may be replaced with an expected future acceleration value predicted by the acceleration/deceleration prediction unit. Thereby, the second threshold value may also be set to an acceleration value instead of the required torque. As a result, when the current required torque is greater than or equal to the first threshold value and the predicted acceleration at a near-future point of time is greater than or equal to the second threshold value represented by an acceleration, downshifting may be performed, and if not, the current speed stage may be maintained.

The present invention described above may be implemented as a computer-readable code on a medium on which a program is recorded. The computer-readable medium includes all kinds of recording devices in which data that may be read by a computer system is stored. Examples of the computer-readable medium include a hard disk drive (HDD), a solid state drive (SSD), a silicon disk drive (SDD), a ROM, a RAM, a CD-ROM, a magnetic tape, a floppy disk, and an optical data storage device.

As apparent from the above description, the present invention has effects as follows.

A hybrid vehicle related to at least one embodiment of the present invention configured as described above may more efficiently control the mode transition.

Particularly, non-driving fuel loss may be minimized because whether or not and when to perform a mode transition are determined through prediction of a near-future required torque and a motor speed using machine learning scheme.

It will be appreciated by those skilled in the art that the effects that can be achieved with the present invention are not limited to what has been described above and other effects of the present invention will be clearly understood from the following detailed description taken in conjunction with the accompanying drawings.

It will be apparent to those skilled in the art that various modifications and variations can be made in the present invention without departing from the spirit or scope of the inventions. Thus, it is intended that the present invention

TABLE 1

| Input signal | Analysis of driving situation | Expected result |
|---|---|---|
| [Navi/Telematics]<br>Road type = Highway<br>Congestion information = Smooth<br>Front event = none<br>[Radar]<br>Front vehicle distance = Close<br>Front vehicle relative velocity = −10 kph<br>[Driving style/history]<br>Constant speed driving for the past 5 minutes<br>[Lane departure prevention system]<br>Maintain the current lane | Constant speed driving<br>Intermittent braking for<br>maintaining the distance<br>from the preceding vehicle | APS = 0,<br>BPS = Small |
| [Navi/Telematics]<br>Road type = Highway<br>Congestion information = Smooth<br>Front event = Tollgate/200 m<br>[Radar]<br>Front vehicle distance = none<br>Front vehicle relative speed = N/A<br>[Driving style/history]<br>Past toll pass average vehicle speed = 50 kph<br>[Lane departure prevention system]<br>Maintain the current lane | Highway driving<br>To go through the tollgate,<br>decrease current speed to 50 kph | APS = 0,<br>BPS = Middle | cover the modifications and variations of this invention provided they come within the scope of the appended claims and their equivalents.

What is claimed is:

1. A method of controlling a mode transition of a hybrid vehicle, the method comprising:
   determining whether a mode transition from a first mode to a second mode is required based on a first torque, the first torque being a current required torque;
   determining a second torque, the second torque being a required torque expected to be generated at a near-future time from a current time;
   determining a predicted gear shift time point and a predicted engagement time point of an engine clutch based on the second torque; and
   performing the mode transition to the second mode when it is determined that the mode transition to the second mode is required and the predicted engagement time point is earlier than the predicted gear shift time point.

2. The method according to claim 1, further comprising maintaining the first mode when it is determined that the mode transition is not required or when the predicted engagement time point is later than the predicted gear shift time point.

3. The method according to claim 2, wherein when the first mode is maintained, the method further comprises performing the mode transition to the second mode after a gear shift is completed.

4. The method according to claim 2, wherein the engine clutch is disposed between an engine and an electric motor, and wherein the first mode includes an EV mode and the second mode includes an HEV mode.

5. The method according to claim 1, further comprising:
   determining positions of an accelerator pedal and a brake pedal; and
   determining the first torque using the determined positions.

6. The method according to claim 1, wherein determining the second torque comprises:
   determining a predicted value of an acceleration/deceleration intention of a driver using an acceleration/deceleration prediction model having driver propensity information, advanced driver assistance system (ADAS) information, navigation information, or vehicle speed information as an input value; and
   determining the second torque using the predicted value of the acceleration/deceleration intention.

7. The method according to claim 6, wherein the acceleration/deceleration prediction model is persistently modified through machine learning-based scheme.

8. The method according to claim 6, wherein the predicted value of the acceleration/deceleration intention comprises position information on an accelerator pedal and a brake pedal at the near-future time.

9. The method according to claim 1, wherein determining the predicted gear shift time point and the predicted engagement time point comprises:
   determining a predicted motor speed at the near-future time based on the second torque; and
   determining the predicted gear shift time point and the predicted engagement time point based on the predicted motor speed.

10. A hybrid vehicle comprising:
    a driving information detection unit configured to interoperate with sensors of the hybrid vehicle to detect driving information according to operation of the vehicle;
    a driver acceleration/deceleration prediction unit configured to generate a predicted value of a near-future acceleration/deceleration intention of a driver reflecting a driving environment of the vehicle, using information transmitted from the driving information detection unit by utilizing an acceleration/deceleration prediction model; and
    a hybrid control unit configured to
       determine a first torque and a second torque using the predicted value of the near-future acceleration/deceleration intention, the first torque being a current required torque and the second torque being a required torque expected to be generated at a near-future time after a current time,
       determine whether a mode transition from a first mode to a second mode is required based the first torque,
       determine a predicted gear shift time point and a predicted engagement time point of an engine clutch based on the second torque, and
       perform the mode transition to the second mode when it is determined that the mode transition to the second mode is required and the predicted engagement time point is earlier than the predicted gear shift time point.

11. The hybrid vehicle according to claim 10, wherein the hybrid control unit is further configured to maintain the first mode when it is determined that the mode transition is not required or when the predicted engagement time point is later than the predicted gear shift time point.

12. The hybrid vehicle according to claim 11, wherein when the first mode is maintained, the hybrid control unit is further configured to perform the mode transition to the second mode after a gear shift is completed.

13. The hybrid vehicle according to claim 11, wherein the engine clutch is disposed between an engine and an electric motor, and wherein the first mode includes an EV mode and the second mode includes an HEV mode.

14. The hybrid vehicle according to claim 10, wherein the hybrid control unit is further configured to:
    determine positions of an accelerator pedal and a brake pedal; and
    determine the first torque using the determined positions.

15. The hybrid vehicle according to claim 10, wherein the hybrid control unit is further configured to:
    determine a predicted value of an acceleration/deceleration intention of a driver using an acceleration/deceleration prediction model having driver propensity information, advanced driver assistance system (ADAS) information, navigation information, or vehicle speed information as an input value; and
    determine the second torque using the predicted value of the acceleration/deceleration intention.

16. The hybrid vehicle according to claim 15, wherein the acceleration/deceleration prediction model is persistently modified through machine learning-based scheme.

17. The hybrid vehicle according to claim 15, wherein the predicted value of the acceleration/deceleration intention comprises position information on an accelerator pedal and a brake pedal at the near-future time.

18. The hybrid vehicle according to claim 10, wherein the hybrid control unit is further configured to:
    determine a predicted motor speed at the near-future time based on the second torque; and
    determine the predicted gear shift time point and the predicted engagement time point based on the predicted motor speed.

19. A hybrid vehicle comprising:

a plurality of sensors configured to sense driving information according to operation of the vehicle;

processing circuitry; and a non-transitory computer-readable recording medium storing a program to be executed by the processing circuitry, the program including instructions to perform the steps of:

generating a predicted value of a near-future acceleration/deceleration intention of a driver reflecting a driving environment of the vehicle, using the driving information and an acceleration/deceleration prediction model;

determining a first torque and a second torque using the predicted value of the near-future acceleration/deceleration intention, the first torque being a current required torque and the second torque being a required torque expected to be generated at a near-future time after a current time;

determining whether a mode transition from a first mode to a second mode is required based the first torque;

determining a predicted gear shift time point and a predicted engagement time point of an engine clutch based on the second torque; and performing the mode transition to the second mode when it is determined that the mode transition to the second mode is required and the predicted engagement time is earlier than the predicted gear shift time point.

* * * * *